United States Patent [19]

Suh et al.

[11] 3,852,280

[45] Dec. 3, 1974

[54] 1-BENZYL-4-(ALKYLIDENE)-HEXAHYDRO-4H-AZEPINES

[76] Inventors: John T. Suh, 3709 W. Scenic Dr., 111 N., Mequon, Wis. 53092; Richard A. Schnettler, 6234 W. Donges Ln., Brown Deer, Wis. 53223

[22] Filed: June 29, 1973

[21] Appl. No.: 375,182

[52] U.S. Cl............ 260/240 F, 424/244, 260/239 B
[51] Int. Cl. ..................... C09b 23/00, C07d 41/08
[58] Field of Search................................. 260/240 F

[56] References Cited
OTHER PUBLICATIONS
Chemical Abstracts, Vol. 68, abstract No. 21858e, (1968), (Abst. of British Pat. No. 1,068,698).

Primary Examiner—John D. Randolph
Attorney, Agent, or Firm—T. F. Kryshak; M. L. Young

[57] ABSTRACT

The compounds are 1-benzyl-4-(alkylidene)-hexahydro-4H-azepines which are useful as central nervous system depressants and analgetic agents. Among the compounds disclosed are 1-benzyl-4-(3'-fluorobenzylidene)-hexahydro-4H-azepine and 1-benzyl-4-(3',4'-dichlorobenzylidene)-hexahydro-4H-azepine.

5 Claims, No Drawings

1-BENZYL-4-(ALKYLIDENE)-HEXAHYDRO-4H-AZEPINES

DETAILED DESCRIPTION

The compounds of the present invention may be represented by the following formula:

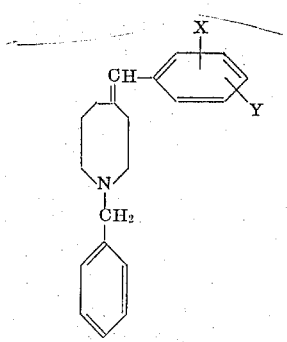

in which X and Y are selected from hydrogen, halogens such as bromo, chloro or fluoro, trifluoromethyl, methylenedioxy, alkyls of 1 to 4 carbon atoms such as methyl, ethyl and isopropyl, and lower alkoxys of 1 to 4 carbon atoms such as methoxy, ethoxy and propoxy.

In the preferred practice of the invention the 1-benzyl-4-(alkylidene)-hexahydro-4H-azepines are prepared by reacting 1-benzylhexahydro-4H-azepine-2-one with a suitable benzyltriphenylphosphonium chloride and butyllithium in tetrahydrofuran under reflux conditions.

The process may be illustrated as follows:

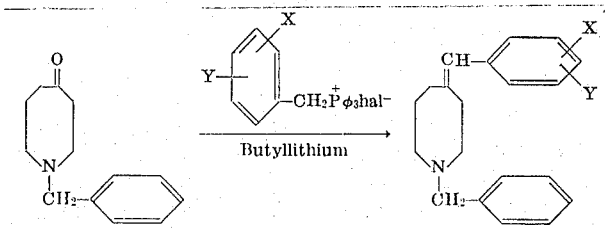

in which X and Y are as previously defined and hal⁻ is a reactive halogen.

The compound 1-benzylhexahydro-4H-azepine-2-one which is employed as the starting material may be prepared as described by A. F. Casy and H. Birnbaum in the *Journal of the Chemical Society*, page 5130 (1964).

The benzyltriphenylphosphonium chlorides which may be employed in the described process are the following:

3-fluorobenzyltriphenylphosphonium chloride,
3,4-dichlorobenzyltriphenylphosphonium chloride,
3-trifluorobenzyltriphenylphosphonium chloride,
3,4-dimethoxybenzyltriphenylphosphonium chloride,
3-methylbenzyltriphenylphosphonium chloride,
2-butylbenzyltriphenylphosphonium chloride, and
3,4-methylenedioxybenzyltriphenylphosphonium chloride.

Representative of the compounds which may be prepared in the manner described are the following:

1-benzyl-4-(3'-fluorobenzylidene)-hexahydro-4H-azepine,
1-benzyl-4-(3',4'-dichlorobenzylidene)-hexahydro-4H-azepine,
1-benzyl-4-(3'-trifluoromethylbenzylidene)-hexahydro-4H-azepine,
1-benzyl-4-(3',4'-dimethoxybenzylidene)-hexahydro-4H-azepine,
1-benzyl-4-(3-methylbenzylidene)-hexahydro-4H-azepine,
1-benzyl-4-(2-butylbenzylidene)-hexahydro-4H-azepine, and
1-benzyl-4-(3,4-methylenedioxybenzylidene)-hexahydro-4H-azepine.

The novel compounds of the present invention are useful as pharmaceutical agents because of their central nervous system depressant and analgetic properties. For example, the compound 1-benzyl-4-(3'-trifluoromethylbenzylidene)-hexahydro-4H-azepine was found to be effective at a dose of about 30 mg/kg intraperitoneally in reducing pain in mice in tests utilizing both electrical shock and heat as stimulants.

In animal behavioral tests the compounds 1-benzyl-4-(3'-fluorobenzylidene)-hexahydro-4H-azepine, 1-benzyl-4-(3',4'-dichlorobenzylidene)-hexahydro-4H-azepine, and 1-benzyl-4-(3'-trifluoromethylbenzylidene)-hexahydro-4H-azepine exhibited a central nervous system depressant activity. In mice receiving 100 mg/kg of the compounds intraperitoneally in the form of a 5% acacia suspension, decreased alertness, reactivity, struggle response and other behavioral characteristics and central nervous system depression were observed. As a result of the behavioral studies, the compounds were found to have $LD_{50}$ values in excess of 175 mg/kg. The behavioral studies were conducted in accordance with the procedure set forth by Irwin in *Animal and Clinical Pharmacologic Techniques in Drug Evaluation*, J. H. Nodine and P. E. Siegler, Ed., Year Book Publishers, Inc., 1964, pp. 36–54.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt-forming compounds with a suitable alkylating agent such as dimethyl sulfate, or an alkyl halide such as methyl chloride, methyl iodide or ethyl bromide.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compounds are not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like may also be employed.

The unit dosage forms may contain a concentration of 0.1 to 10 percent or more by weight of one or more of the novel compounds. Generally, such dosage forms will contain about 5 to 250 mg. of the active ingredients. One or more of such dosage forms may be administered daily. In actual practice, the amount of drug required to produce the desired effected will, of course, vary considerably because of patient differences.

The following examples are presented to illustrate this invention:

EXAMPLE 1

1-Benzyl-4-(3'-fluorobenzylidene)-hexahydro-4H-azepine

To a slurry of 20.7 g. (0.051 mole) of 3-fluorobenzyltriphenylphosphonium chloride in 500 ml. of dry tetrahydrofuran, 36.9 ml. (0.051 mole) of butyllithium in hexane is added. The orange solution is stirred 1 hour at 21° and 9.5 g. (0.046 mole) of 1-benzylhexahydro-4H-azepine-2-one is slowly added. The mixture is refluxed for 24 hours, the solvent distilled off and the gummy residue triturated under hot cyclohexane. The solids are filtered and washed with cyclohexane. The filtrates are combined, washed with water, brine and dried (Na$_2$SO$_4$), after which the solvent is removed leaving 12.8 g. of a dark oil. The oil is chromatographed over silica gel (200 g.) using benzene: ethyl alcohol (9.9:0.2) affording 5.7 g. of an amber oil which is passed through the Kugelrohr apparatus at 125°–130° (0.1 mm.) to afford 4.7 g. of 1-benzyl-4-(3'-fluorobenzylidene)-hexahydro-4H-azepine as a clear colorless oil.

Anal. Calcd. for C$_{20}$H$_{22}$FN: C, 81.35; H, 7.51; N, 4.74.

Found: C, 81.20; H, 7.38; N, 4.57.

EXAMPLE 2

1-Benzyl-4-(3',4'-dichlorobenzylidene)-hexahydro-4H-azepine

To a slurry of 12.6 g. (0.0275 mole) of 3,4-dichlorobenzyltriphenylphosphonium chloride in 250 ml. of dry tetrahydrofuran is added 20 ml. (0.0275 mole) of butyllithium in hexane. The solution is stirred one hour at room temperature and 5.1 g. (0.025 mole) of 1-benzylhexahydro-4H-azepin-4-one is added dropwise. The mixture is refluxed four hours, and the solvent removed under reduced pressure. The remaining red semi-solids are boiled in cyclohexane, filtered, and the filtrate extracted with 10 percent hydrochloric acid solution. The acidic portion is washed with ether, made alkaline with 10% sodium hydroxide solution, extracted with chloroform which is washed with water, saturated brine, and dried (Na$_2$SO$_4$). Removal of the solvent leaves 7.5 g. of an amber oil which is chromatographed over 120 g. of silica gel using ethyl acetate. The material ($R_f = 0.8$) is passed through the Kugelrohr apparatus to afford 3.7 g. of 1-benzyl-4-(3',4'-dichlorobenzylidene)-hexahydro-4H-azepine as a clear colorless viscous oil, b.p. 125°–133°.

Anal. Calcd. for C$_2$H$_{21}$Cl$_2$N: C, 69.36; H, 6.11; N, 4.05.

Found: C, 69.14; H, 5.88; N, 4.25.

EXAMPLE 3

1-Benzyl-4-(3'-trifluoromethylbenzylidene)-hexahydro-4H-azepine

To a slurry of 9.3 g. (0.0205 mole) of 3-trifluoromethylbenzyltriphenylphosphonium chloride in 135 ml. of anhydrous THF is added 12.2 ml. (0.0205 mole) of butyllithium in hexane. The mixture is stirred 15 minutes at 21° and 2.7 g. (0.0135 mole) of 1-benzylhexahydro-4H-azepin-4-one are added dropwise. The mixture is refluxed 96 hours, cooled, water added, and extracted with ethyl acetate, washed with water, saturated brine and dried over Na$_2$SO$_4$. Removal of the solvent leaves a waxy solid which is chromatographed over silica gel (ethyl acetate) to afford 1.3 g. ($R_f = 0.9$) of the product. Distillation through the Kugelrohr apparatus affords 1.0 g., b.p. 117°–121° (0.05 mm.) of 1-benzyl-4-(3'-trifluoromethylbenzylidene)-hexahydro-4H-azepine as a clear colorless oil.

Anal. Calcd. for C$_{21}$H$_{22}$F$_3$N: C, 73.01; H, 6.42; N, 4.06.

Found: C, 73.40; H, 6.22; N, 4.20.

We claim:

1. A compound of the formula

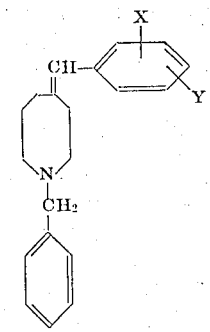

in which X and Y are selected from hydrogen, bromo, chloro, fluoro, trifluoromethyl, methylenedioxy, lower alkyl of 1 to 4 carbons, and lower alkoxy of 1 to 4 carbons.

2. The compound of claim 1 in which X and Y are hydrogen.

3. The compound of claim 1 which is 1-benzyl-4-(3'-fluorobenzylidene)-hexahydro-4H-azepine.

4. The compound of claim 1 which is 1-benzyl-4-(3',4'-dichlorobenzylidene)-hexahydro-4H-azepine.

5. The compound of claim 1 which is 1-benzyl-4-(3'-trifluoromethylbenzylidene)-hexahydro-4H-azepine.

* * * * *